United States Patent
McGarry

(10) Patent No.: US 6,471,221 B1
(45) Date of Patent: Oct. 29, 2002

(54) TRASH CAN SYSTEM

(76) Inventor: Kevin McGarry, 128 10th Ave., Indian Rocks Beach, FL (US) 33785

( * ) Notice: Subject to any disclaimer, the term of this patent is extended or adjusted under 35 U.S.C. 154(b) by 0 days.

(21) Appl. No.: 09/789,995

(22) Filed: Feb. 21, 2001

(51) Int. Cl.$^7$ .............................. B62B 1/14; B60B 35/00
(52) U.S. Cl. .................. 280/47.26; 280/47.24; D34/5; 220/772; 220/908; 301/124.1; 301/131
(58) Field of Search .......................... 280/47.26, 47.24, 280/47.315, 5.2, 47.27; 220/772, 769, 676, 771, 908, 908.1, 908.3, 909, 495.04, 495.05, 495.06, 495.11, 212.5, 495.01, 767, 768, 770; 414/408, 411; D34/1, 5, 6, 7, 11; 294/137; 301/124.1, 106, 131, 124.2

(56) References Cited

U.S. PATENT DOCUMENTS

| | | | | |
|---|---|---|---|---|
| 3,876,223 A | * | 4/1975 | O'Reilly et al. | |
| 4,609,200 A | * | 9/1986 | Winter | |
| 5,088,750 A | * | 2/1992 | Beese et al. | 220/908 |
| D332,852 S | * | 1/1993 | Delmerico | D34/5 |
| D347,095 S | * | 5/1994 | Apps et al. | D34/5 |
| 5,388,717 A | * | 2/1995 | LeVasseur | |
| 5,390,818 A | * | 2/1995 | LaBuda | 220/908 |
| 5,547,104 A | * | 8/1996 | Parker | 220/908 |
| 5,803,303 A | * | 9/1998 | Timm et al. | 220/908.01 |
| D421,168 S | * | 2/2000 | France | D34/1 |
| 6,075,221 A | * | 6/2000 | Minhas | |
| 6,145,856 A | * | 11/2000 | Conti | 280/47.26 |
| 6,223,927 B1 | * | 5/2001 | Rand | 220/908.1 |
| 6,299,258 B1 | * | 10/2001 | Wright et al. | 301/124.1 |

* cited by examiner

Primary Examiner—Douglas C. Butler

(57) ABSTRACT

A trash can system has a container. The container has a large upper periphery with a front and a rear. The container also has a small lower periphery with a front and a rear. Between the upper and lower peripheries, the container also has a side wall. The container also has a recess. The recess has a generally rectilinear configuration formed at the bottom of the side wall at the rear of the lower periphery. Within the recess is a lower tubular handle. The handle is in a horizontal orientation with a central extent of the handle being spaced from the container.

1 Claim, 3 Drawing Sheets

TRASH CAN SYSTEM

BACKGROUND OF THE INVENTION

1. Field of the Invention

The present invention relates to a trash can system and more particularly pertains to facilitating the holding of a trash can while emptying and while removing a liner therefrom.

2. Description of the Prior Art

The use of trash cans of known designs and configurations is known in the prior art. More specifically, trash cans of known designs and configurations previously devised and utilized for the purpose of emptying trash cans and removing their liners through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,776,405 to Prout et al discloses a method for molding a rotationally-molded container. U.S. Pat. No. 4,930,649 to Moser discloses a refuse container with molded hinge. U.S. Pat. No. 5,690,247 to Boover discloses a wastebasket for removing and retaining a trash can liner. Finally, U.S. Pat. No. 5,803,303 to Timm et al discloses a vented foot held wastebasket.

While these devices fulfill their respective, particular objectives and requirements, the aforementioned patents do not describe a trash can system that allows facilitating the holding of a trash can while emptying and while removing a liner therefrom.

In this respect, the trash can system according to the present invention substantially departs from the conventional concepts and designs of the prior art, and in doing so provides an apparatus primarily developed for the purpose of facilitating the holding of a trash can while emptying and while removing a liner therefrom.

Therefore, it can be appreciated that there exists a continuing need for a new and improved trash can system which can be used for facilitating the holding of a trash can while emptying and while removing a liner therefrom. In this regard, the present invention substantially fulfills this need.

SUMMARY OF THE INVENTION

In view of the foregoing disadvantages inherent in the known types of trash cans of known designs and configurations now present in the prior art, the present invention provides an improved trash can system. As such, the general purpose of the present invention, which will be described subsequently in greater detail, is to provide a new and improved trash can system and method which has all the advantages of the prior art and none of the disadvantages.

To attain this, the present invention essentially comprises a container. The container is in a generally rectilinear configuration and has a large rectangular upper periphery. The container also has a long horizontal front edge and a parallel rear edge. Provided between the front and rear edges are parallel side edges. The container also has a small rectangular lower periphery with a long horizontal front edge and a parallel rear edge. Provided between these front and rear edges are parallel side edges. The container also has generally trapezoidal side walls between the upper and lower peripheries. Next provided is a recess. The recess is in a generally rectilinear configuration. The recess is formed at the bottom of one side wall at the rear edge of the lower periphery. A transportation assembly is next provided. The transportation assembly includes a rigid metallic axle. The axle has a cylindrical configuration with a wheel at each end. A large length of the axle is defined between the wheels. Next provided is a pair of laterally spaced axle supports. The axle supports are located within the recess. The location of the supports allows the axle to be rotatably received adjacent to and between the wheels. The wheels are beneath parallel side walls of the container. The lower extents of the wheels are positionable beneath the container for transportation purposes. Additionally, a lower tubular handle is provided. The handle is located within the recess in a horizontal orientation encompassing the axle. The handle has opposed ends formed integrally with the axle supports. The handle is spaced from the container. Also provided is an upper handle. The upper handle is formed adjacent to the rear edge of the upper periphery above the tubular handle. Lastly provided is a planar surface. The planar surface is in a horizontal orientation. The planar surface is formed on the upper surface of the handle with linear grooves in a crossing pattern. This pattern allows for increasing the frictional capabilities so as to abate slippage. The handle is adapted to be grasped by a user concurrently with the grasping of the upper edge of the container for inversion of the container during emptying. The planar surface is adapted to receive the foot of a user to abate suction problems when lifting a liner from the container.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trash can system which has all of the advantages of the prior art trash cans of known designs and configurations and none of the disadvantages.

It is another object of the present invention to provide a new and improved trash can system which may be easily and efficiently manufactured and marketed.

It is further object of the present invention to provide a new and improved trash can system which is of durable and reliable constructions.

An even further object of the present invention is to provide a new and improved trash can system which is susceptible of a low cost of manufacture with regard to both materials and labor, and which accordingly is then susceptible of low prices of sale to the consuming public, thereby making such trash can system economically available to the buying public.

Even still another object of the present invention is to provide a trash can system for facilitating the holding of a trash can while emptying and while removing a liner therefrom.

Lastly, it is an object of the present invention to provide a new and improved trash can system having a container. The container has a large upper periphery with a front and a rear. The container also has a small lower periphery with a front and a rear. Between the upper and lower peripheries, the container also has a side wall. The container also has a recess. The recess is in a generally rectilinear configuration. The recess is formed at the bottom of the side wall at the rear of the lower periphery. Within the recess is a tubular handle. The handle is in a horizontal orientation with a central extent of the handle being spaced from the container.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
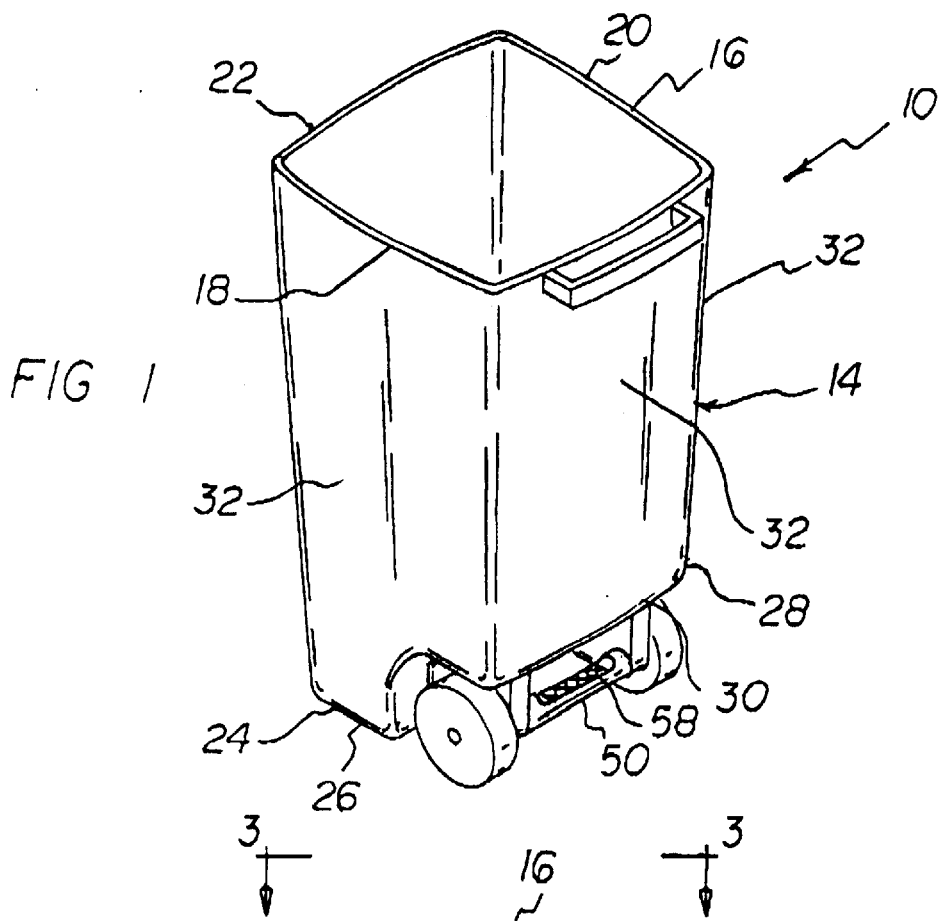
FIG. 1 is a perspective illustration of the preferred embodiment of the trash can constructed in accordance with the principles of the present invention.
Figure 2:
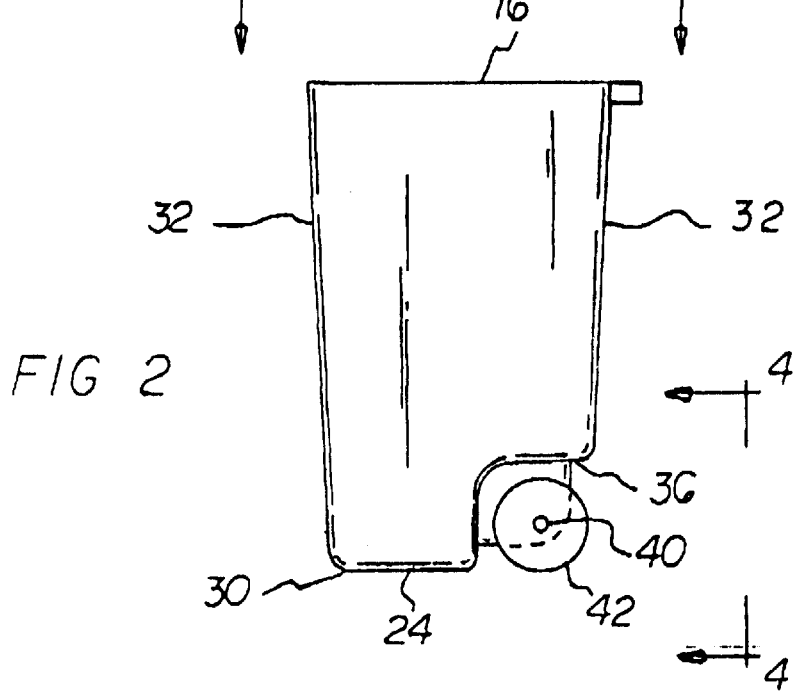
FIG. 2 is an end elevational view of the system shown in FIG. 1.
Figure 3:
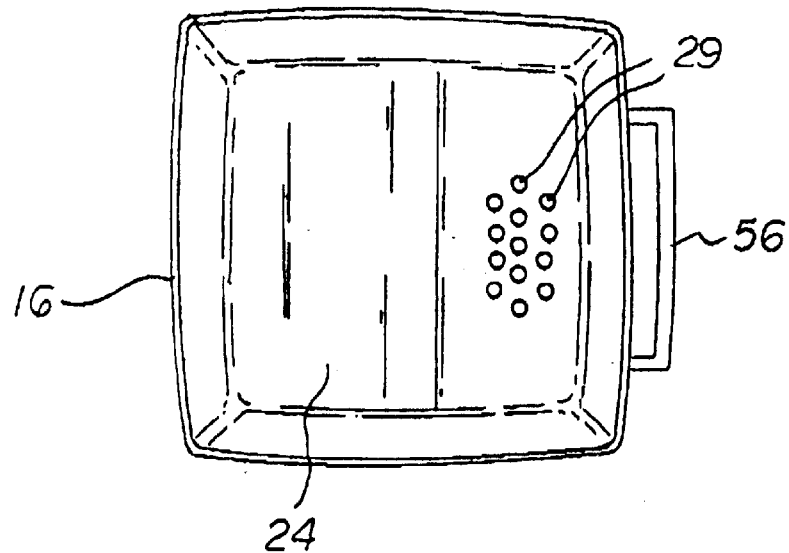
FIG. 3 is a top plan view of the system shown in FIGS. 1 and 2.
Figure 4:
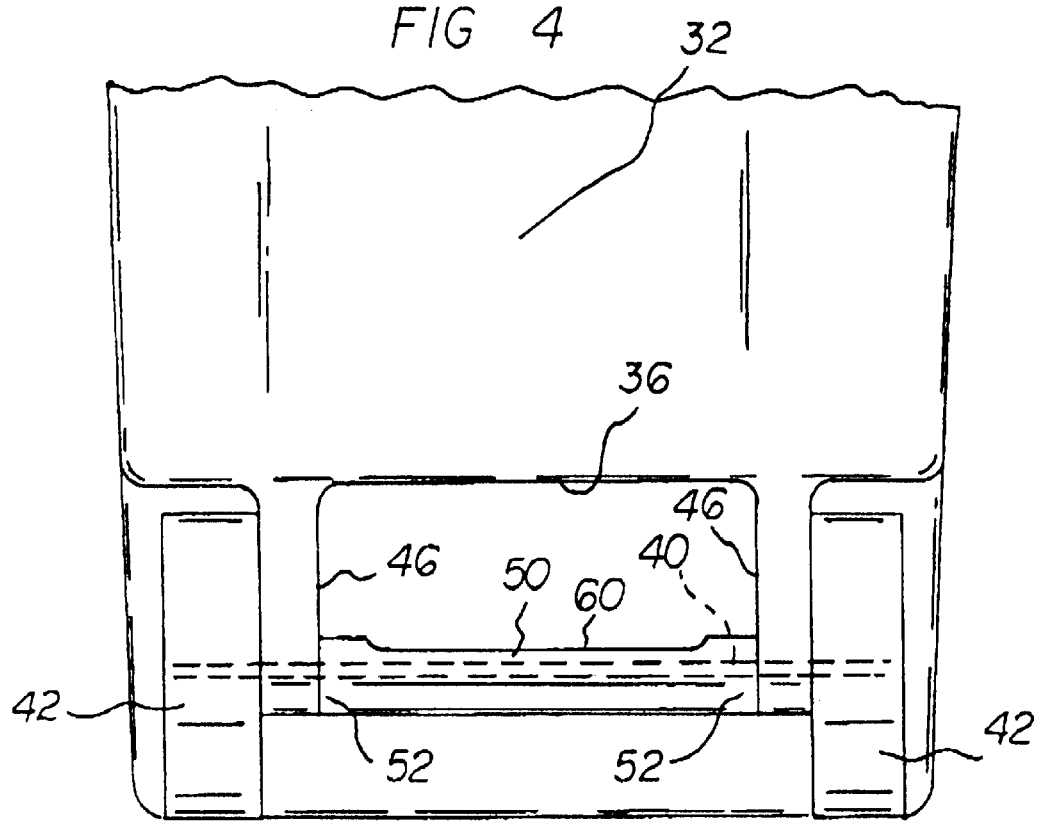
FIG. 4 is an enlarged illustration taken along line 4—4 of FIG. 2.

With reference now to the drawings, and in particular to FIG. 1 thereof, the preferred embodiment of the new and improved trash can system embodying the principles and concepts of the present invention and generally designated by the reference numeral 10 will be described.

The present invention, the trash can system 10 is comprised of a plurality of components. Such components in their broadest context include a container, a recess and a lower tubular handle. Such components are individually configured and correlated with respect to each other so as to attain the desired objective.

First provided is a container 14. The container is in a generally rectilinear configuration and has a large rectangular upper periphery 16. The container also has a long horizontal front edge 18 and a parallel rear edge 20. Provided between the front and rear edges are parallel side edges 22. The container also has a small rectangular lower periphery 24 with a long horizontal front edge 26 and a parallel rear edge 28. The bottom floor is formed with small air holes or apertures 29 to abate the creation of suction when removing a liner from the container. The use of air holes through the container adjacent to the bottom is an optional, but preferred, feature for all of the embodiments of the present invention. They are of particular importance for applications where removable liners are utilized. Provided between these front and rear edges are parallel side edges 30. The container also has generally trapezoidal side walls 32 between the upper and lower peripheries.

Next provided is a recess 36. The recess is in a generally rectilinear configuration. The recess is formed at the bottom of one side wall at the rear edge of the lower periphery.

A transportation assembly is next provided. The transportation assembly includes a rigid metallic axle 40. The axle has a cylindrical configuration with a wheel 42 at each end. A large length of the axle is defined between the wheels.

Next provided is a pair of laterally spaced axle supports 46. The axle supports are located within the recess. The location of the supports allows the axle to be rotatably received adjacent to and between the wheels. The wheels are beneath parallel side walls of the container. The lower extents of the wheels are positionable beneath the container for transportation purposes.

Additionally, a lower tubular handle 50 is provided. The handle is fixedly secured with respect to the container and is located within the recess in a horizontal orientation encompassing the axle. The handle has opposed ends 52 formed integrally with the axle supports. The handle is spaced from the container.

Also provided is an upper handle 56. The upper handle is formed adjacent to the rear edge of the upper periphery above the tubular handle.

Lastly provided is a planar surface 60. The planar surface is in a horizontal orientation. The planar surface is formed on the upper surface of the handle with linear grooves in a crossing pattern. This pattern allows for increasing the frictional capabilities so as to abate slippage. The handle is adapted to be grasped by a user concurrently with the grasping of the upper edge of the container for inversion of the container during emptying. The planar surface is adapted to receive the foot of a user to abate suction problems when lifting a liner from the container.

Figure 5:
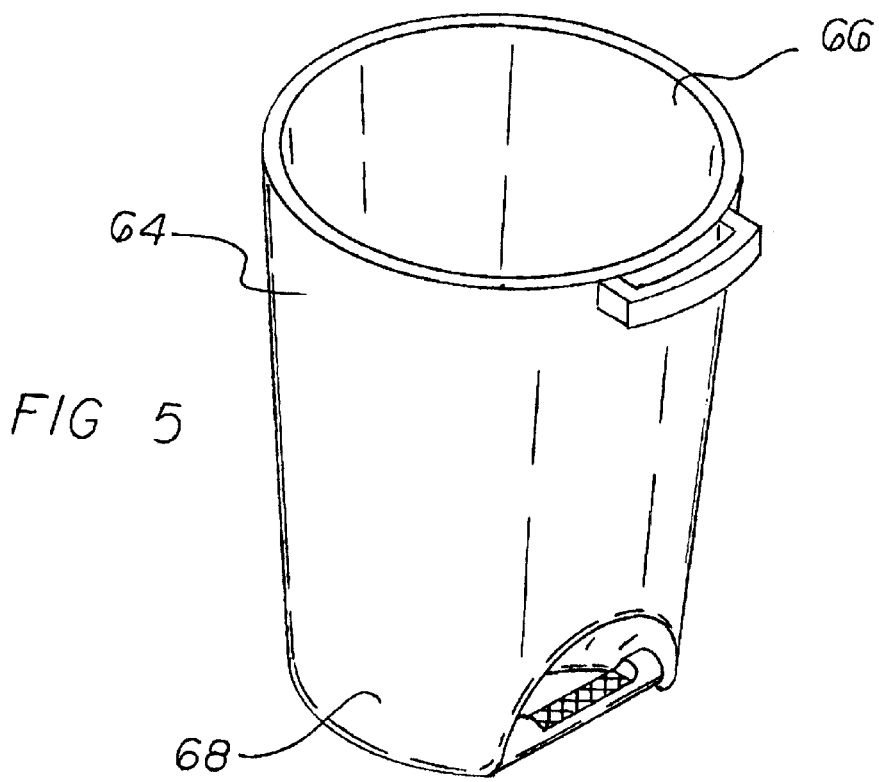
FIG. 5 is a perspective illustration of an alternate embodiment of the present invention.

In an alternate embodiment of the invention, the container 64 has a circular upper periphery and a circular lower periphery. See FIG. 5. In such embodiment the lower handle is fixedly secured with respect to the container and is located beneath an upper handle for lifting and dumping purposes.

Figure 6:
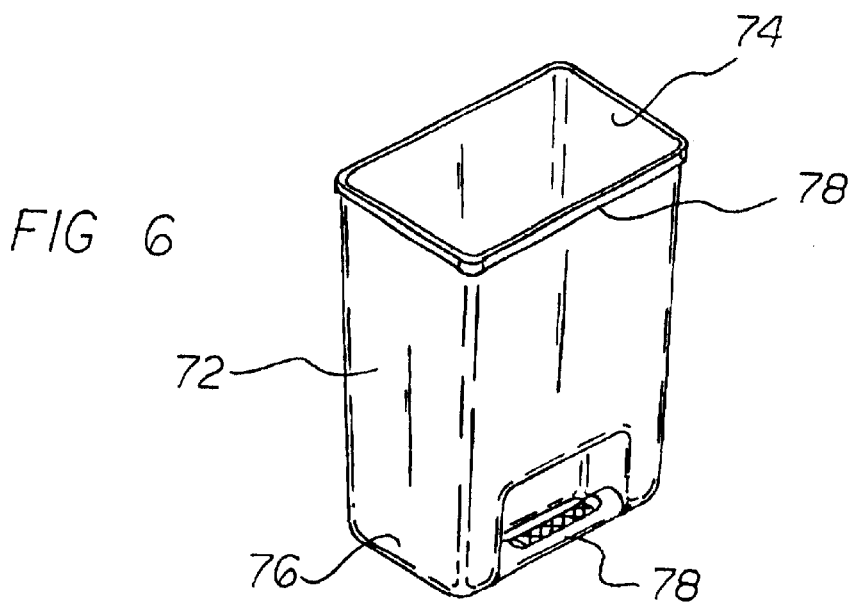
FIG. 6 is a perspective illustration of another alternate embodiment of the present invention.

In another alternate embodiment of the invention, the container 68 as a large rectangular upper periphery and a small rectangular lower periphery. A handle is formed integrally with the upper and lower peripheries. A lip extending around the entire upper periphery provides an upper handle above the lower handle for gripping purposes. See FIG. 6. Note is taken that in these alternate embodiments, the lowermost extent of the lower handle is in the plane of the lowermost extent of the container floor and the lower periphery. In this manner, stability is maintained when a user places a foot on the handle for liner removal. The lower handle is thus spaced from the container entirely around the handle but the lower handle in contact with the floor during normal use. The container must be tipped rearwardly to lift the handle prior to grasping.. Tipping of the wheeled embodiment is not required since the lower handle is above the ground for grasping with the wheels providing stability when a user's foot is placed thereon as for liner removal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trash can system for facilitating the holding of a trash can while emptying and while removing a liner therefrom comprising, in combination:

a container in a generally rectilinear configuration having a large rectangular upper periphery with a long horizontal front edge and a parallel rear edge and with parallel side edges there between, the container also having a small rectangular lower periphery with a long horizontal front edge and a parallel rear edge and with parallel side edges there between, the container also having generally trapezoidal side walls between the upper and lower peripheries;

a recess having a generally rectilinear configuration formed at the bottom of one side wall at the rear edge of the lower periphery;

a transportation assembly including a rigid metallic axle having a cylindrical configuration with a wheel at each end defining a large length there between;

a pair of laterally spaced axle supports located within the recess for rotatably receiving the axle adjacent to and between the wheels with the wheels beneath parallel side walls of the container with the lower extents of the wheels positionable beneath the container for transportation purposes;

a lower tubular handle located within the recess in a horizontal orientation encompassing the axle, the handle having opposed ends formed integrally with the axle supports, the handle being spaced from the container;

an upper handle formed adjacent to the rear edge of the upper periphery above the tubular handle; and a planar surface in a horizontal orientation formed on the upper surface of the lower handle with linear grooves in a crossing pattern for increasing the frictional capabilities so as to abate slippage, the lower handle adapted to be grasped by a user concurrently with the grasping of the upper edge of the container for inversion of the container during emptying and with the planar surface adapted to receive the foot of a user to abate suction problems when lifting a liner from the container.

* * * * *